UNITED STATES PATENT OFFICE.

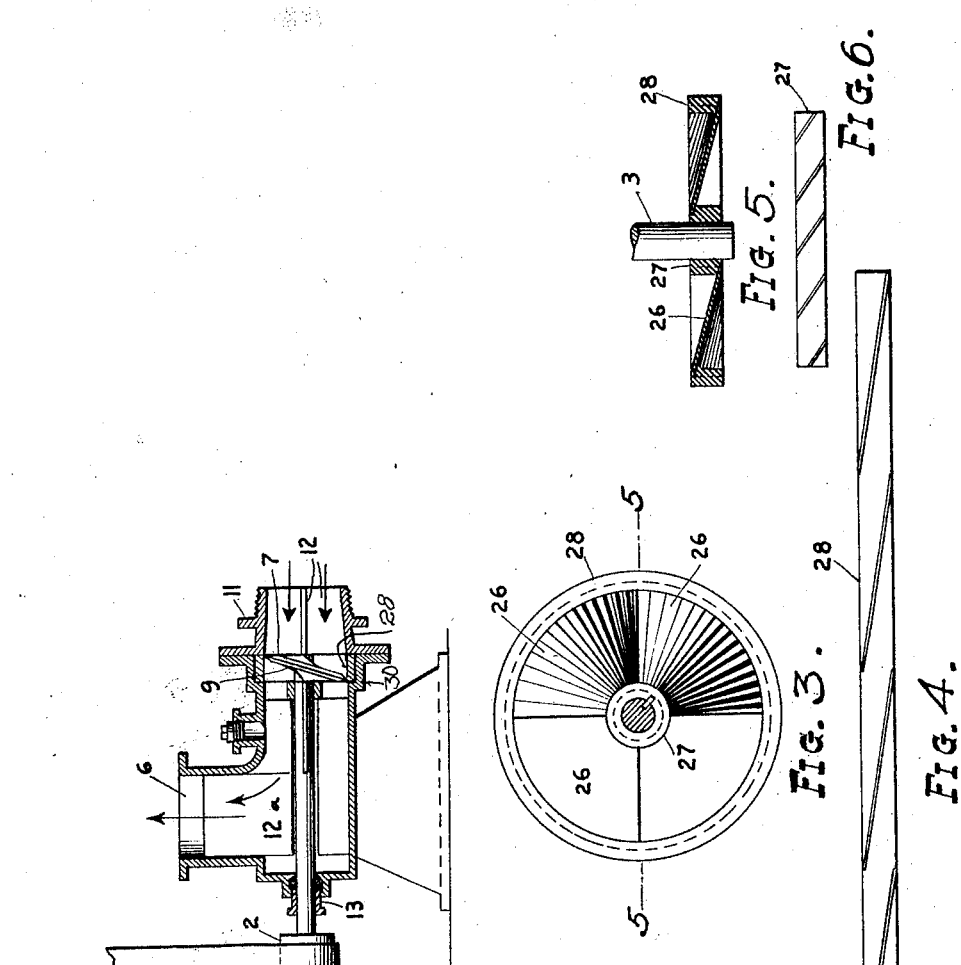

MARX PETER SCHETZEL, OF OAKLAND, CALIFORNIA.

PROPELLER-PUMP.

1,401,193.  Specification of Letters Patent.  Patented Dec. 27, 1921.

Application filed September 18, 1917. Serial No. 191,935.

*To all whom it may concern:*

Be it known that I, MARX PETER SCHETZEL, a citizen of the United States, residing at Oakland, in the county of Alameda and State of California, have invented certain new and useful Improvements in Propeller-Pumps, of which the following is a specification.

This invention is an improvement in propeller pumps.

The object of the invention is to provide a pump with propellers so arranged that the friction and loss of power due to thrust will be eliminated.

By using two opposite propellers in right and left relation to each other keyed on the same shaft, I neutralize the thrust ordinarily imposed on a thrust block where but one propeller is used and thereby increase the ratio of propelling force to the amount of power applied.

A further object of the invention is to provide a pump of the character described to which the motive power, whether by driven pulley or direct connection, may be applied to the shaft at a point between the propellers.

A further object is to provide a means of intake and discharge by which the fluid may be diverted into separate channels or combined in one discharge as the occasion demands.

These objects are fully accomplished in the novel structure described in the following specification and illustrated in the accompanying drawings, in which, Figure 1 is a vertical central section of one form of my improved propeller pump.

Fig. 2 is a vertical end view of an inlet port showing a baffle therein.

Fig. 3 is an end view of a propeller on a shaft.

Fig. 4 is a plan of the periphery of the propeller.

Fig. 5 is a section of Fig. 3 on the line 5—5.

Fig. 6 is a plan of the periphery of the propeller hub.

Referring to the drawings, Fig. 1, 1 indicates a belt driving a pulley 2 keyed to a shaft 3 rotating in bearings 4 integral with rotor chambers, here shown of pipe construction in the form of elbows.

The upper and lower ends of the elbows form respectively discharge ports 6 and inlet ports 7. The inlet ports 7 have enlarged flanged ends formed with socket bearings 30 in which are journaled the outer rims 28 of propellers 8 and 9 keyed to the shaft 3 in right and left relation to each other, arranged to draw fluid into the intake ports 7. Bolted to the intakes 7 are nipples 11 threaded for pipe connection the inner end of nipples resting adjacent the outer edge of said propeller rims.

Because of the fact that the interior of the rotor chambers is circular the natural tendency of the water is to rotate with the propellers instead of being diverted into the discharge ports. In order to obviate this, I provide in the interior of the nipples 11 and inlet ports 7, baffles 12 which are in the form of crosses in cross section and are cast integral with the nipples and elbows.

Throughout the vertical members of the elbows, the horizontal baffles are cut away leaving only a vertical web 12$^a$ in the center of the discharge port. The elbows are provided with stuffing boxes 13.

Blades 26 of thin metal are bent into propeller blade shape and cast with one end embedded in a case metal hub 27, and the opposite or outer ends of the blades 26 are embedded in a cast metal rim 28 which is journaled in the pump housing.

Fig. 5 shows this construction in central section; Fig. 3 in end view, and Figs. 4 and 6 are plans respectively of the peripheries of rim 28 and hub 27.

Having described my invention, what I claim as new and wish to secure by Letters Patent is:—

A propeller pump including a housing having an inlet and an outlet, the inlet end of said housing being enlarged and forming a socket bearing, a shaft journaled in said housing, a propeller on said shaft, said propeller including a ring at the outer edge of its blades which ring is journaled in said socket bearing and a nipple secured to the inlet end of said housing with its inner end adjacent the outer edge of said propeller ring to hold the propeller in said socket bearing.

In testimony whereof he affixes his signature.

MARX PETER SCHETZEL.